United States Patent [19]
Moore

[11] Patent Number: 5,103,917
[45] Date of Patent: Apr. 14, 1992

[54] ADJUSTABLE CALIBRATION ASSEMBLY FOR A GUIDANCE SYSTEM

[75] Inventor: Michael L. Moore, Carroll, Iowa
[73] Assignee: Sukup Manufacturing Company, Sheffield, Iowa
[21] Appl. No.: 516,036
[22] Filed: Apr. 27, 1990
[51] Int. Cl.⁵ .............................................. A01B 69/00
[52] U.S. Cl. .................................... 172/6; 250/231.1; 250/239; 318/587
[58] Field of Search .......................... 172/2, 6, 26, 5, 4; 37/DIG. 19, DIG. 20; 356/152; 56/10.2; 116/DIG. 13, DIG. 20; 33/365, 366, 369, 533, 624, 645; 318/580, 587; 171/9; 250/229, 231.1, 231.14, 231.18, 239; 280/776; 180/131; 104/244.1; 364/424.01, 424.07

[56] References Cited
U.S. PATENT DOCUMENTS

| | | | |
|---|---|---|---|
| 2,596,994 | 5/1952 | Haberland | 250/239 X |
| 3,902,063 | 8/1975 | Oelsch et al. | 250/233 |
| 4,616,712 | 10/1986 | Jorgensen | 172/6 |
| 4,883,128 | 11/1989 | O'Neall et al. | 172/430 |
| 4,930,581 | 6/1990 | Fleischer et al. | 172/6 |

OTHER PUBLICATIONS

"Orthman Manufacturing's New MPIII Tracker Guidance System", Machinery Today, Farm Journal Jun.-/Jul. 1989.
"The Guide" by Lincoln Creek Mfg., Owner's Guide and Parts List, received 2/21/89.
Sukup Auto-Guide Guidance System Sales Brochures, Sukup Mfg.
Machinery Today Article on "The Auto-Guide System", Farm Journal, Apr. 1, 1989, p. 32.
"End Cultivator Blight", Farm Industry News, Jul. 1989, p. 57.

Primary Examiner—Dennis L. Taylor
Assistant Examiner—Jeffrey L. Thompson
Attorney, Agent, or Firm—Neuman, Williams, Anderson & Olson

[57] ABSTRACT

An agricultural implement guidance control system has a wand sensor housing which contains a vertical shaft attached to the wand bracket and thus to the sensing wands. Affixed to the shaft is a photoelectric light source which projects a beam of light at a pair of photoelectric sensors. The photoelecltric sensors are mounted on a printed circuit board which is mounted to a slide plate. The slide plate is supported by slide supports and the slide supports have grooves in which the edges of the slide plates are positioned. The slide plate is able to slide left or right inside the grooves. An adjustment screw threadably engages a flange on the slide plate. The rotation of the adjustment screw causes the adjustable positioning of the slide plate to the left or right depending upon the rotation of the screw. Calibration of the guidance system with respect to the position of the sensing wands is accomplished by selective rotation of the adjustment screw.

18 Claims, 5 Drawing Sheets

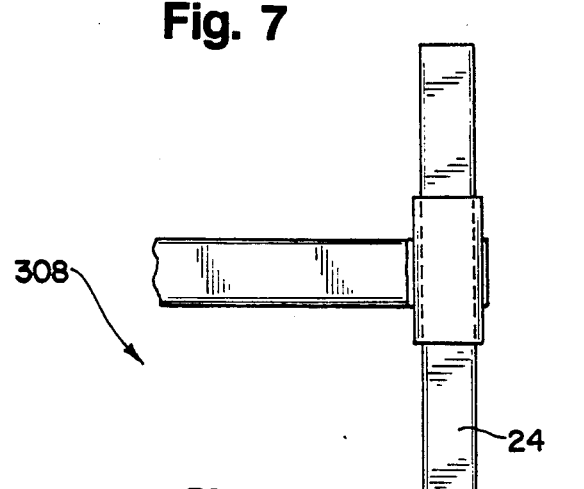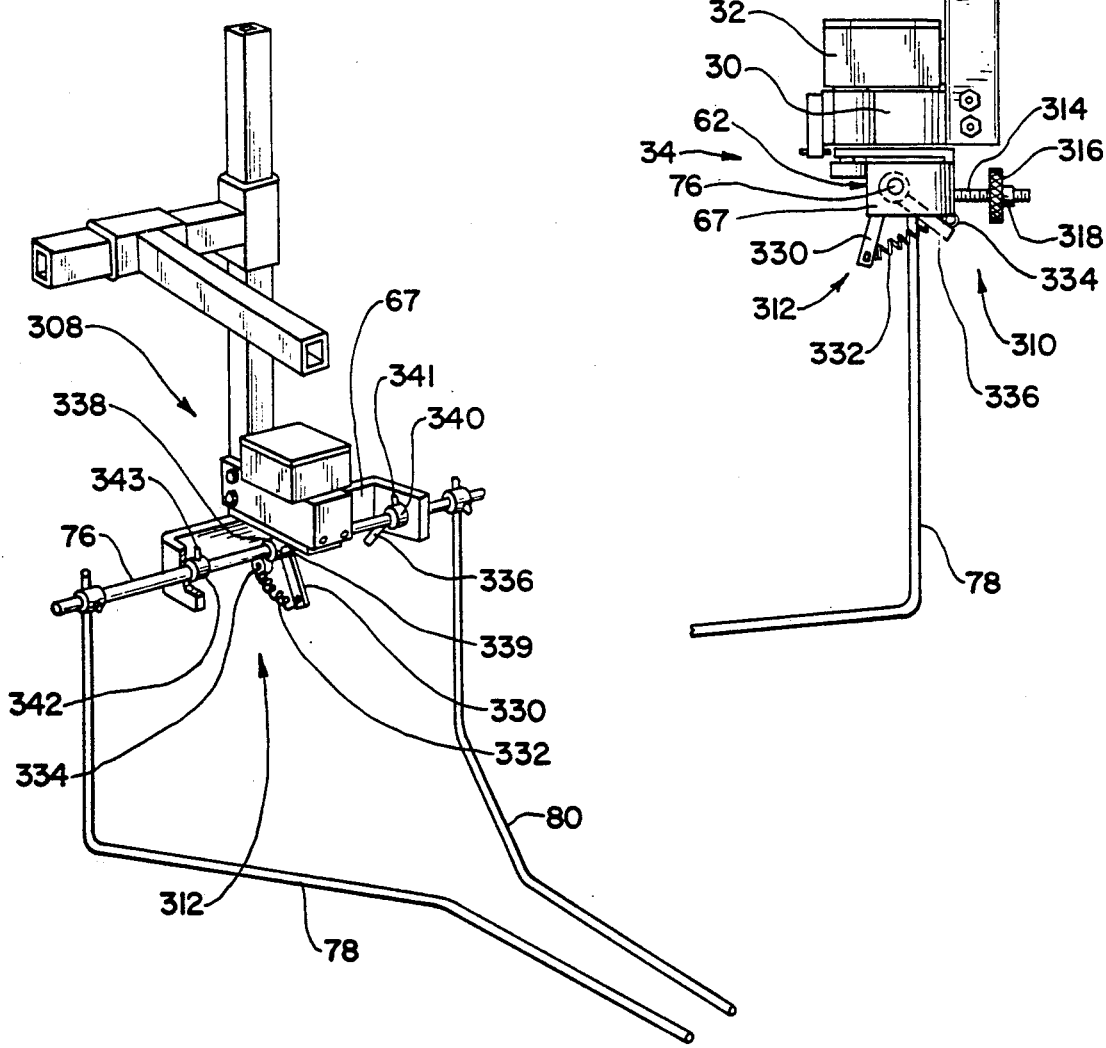

U.S. Patent    Apr. 14, 1992    Sheet 5 of 5    5,103,917

ADJUSTABLE CALIBRATION ASSEMBLY FOR A GUIDANCE SYSTEM

BACKGROUND OF THE INVENTION

This invention relates to a guidance system for agricultural equipment and more particularly to an adjustable calibration assembly for the guidance system.

Various agricultural machines utilize plant sensing wands mounted on the machine for sensing the position of the standing plants for various purposes. Typically, this sensing is for guidance purposes to provide a feedback signal to a machine guidance or positioning mechanism to assure proper positioning of the machine relative to a row of such plants. By way of example, such sensors and guidance systems may be utilized on cultivating equipment.

The sensing wands are affixed to a rotatable shaft. The shaft and wand may be biased to a predetermined angular position. As the wand contacts the crop, its angular position is adjusted whereby the angular position of the shaft reflects the sensed position of the crop relative to the machine.

Calibration of the sensing wands is necessary due to variations in crops and equipment. In previous units, the calibration was effected by adjusting a collar on the rotatable shaft. The set screw on the collar would be loosened and the angular relationship between the collar and the shaft would be adjusted to calibrate the wands. After obtaining the proper adjustment, the set screw is tightened while maintaining a precise angular relationship between the collar and the shaft.

The set screw and collar assembly is also used to calibrate the machine guidance or positioning mechanism which assures proper positioning of the machine relative to the row of plants. The guidance mechanism has an assembly which indicates the position of the guidance mechanism relative to the agricultural tractor on which the guidance mechanism is attached. Calibration of the guidance mechanism is necessary due to variations in crops and equipment.

This calibration or angular adjustment assembly becomes difficult to use for several reasons. The end of the set screw leaves indentations or scars on the surface of the shaft. After several adjustments, the surface of the shaft has several indentations. The set screw tends to move into one of the indentations when it is tightened which may not correspond to the desired adjustment. Therefore, these indentations make it difficult to perform precise adjustments.

Furthermore, it is necessary to perform precise adjustments because a small angular adjustment can significantly increase the performance of the guidance system. The set screw and collar assembly does not enable the operator to perform fine or precise adjustments of the assembly during calibration.

In addition, the set screw and collar assembly is not easily accessible to the operator and therefore, it is difficult for the operator to make the calibration adjustments.

One object of this invention is to provide an improved calibration device for a guidance system.

Another object of this invention is to provide a calibration device which will permit precise calibration of the sensing system.

Another object of this invention is to provide a calibration device which is less difficult to use and more accurate than prior devices.

Other objects and advantages of the invention will become apparent upon reading the following detailed description and appended claims, and upon reference to the accompanying drawings.

SUMMARY OF THE INVENTION

The aforementioned requirements and objects are satisfied through the adjustable calibration assembly of this invention. The wand sensing assembly is mounted to the agricultural implement by a bracket assembly which extends in front of the implement and provides orthogonal, vertical and horizontal positioning adjustment of the sensor assembly. A horizontal bracket slides within a sleeve to permit lateral adjustment of the wand sensing assembly and is held in position by set screws. A vertical bracket slides within a sleeve on the horizontal bracket to permit vertical adjustment of the wand sensing assembly and is held in position by bolts.

A support bracket for the wand position sensor is attached to the lower end of the vertical bracket and supports the wand position sensor mechanism. The latter mechanism includes a fixed housing, a pivotable support for the wands and a sensor for responding to the relative angular position of the wand support relative to the housing.

The wand sensor includes a vertical shaft which extends downward and is attached to the wand bracket. The wand bracket is U-shaped and has two sets of holes on each leg of the bracket. A support rod can be inserted into either the upper or lower holes. The wands are attached to each end of the support rod. The wands can be positioned to sense off of one row of small crops or between two rows of larger crops.

A collar is attached to the upper end of the shaft which is located inside the fixed sensor housing, and affixed to the collar is a photoelectric light source. The light source projects a beam of light at a pair of photoelectric sensors which are mounted inside the housing. In the zero or null calibration setting the beam of light should shine between the photoelectric sensors.

When the sensing wands are displaced, the shaft is rotated in the corresponding direction and activates the respective photoelectric sensor. The photoelectric sensor provides an electronic signal to the guidance control system which provides output for corrective action to the guidance mechanism. The guidance mechanism will adjust the movement of the implement or its relevant components to effect lateral adjustment thereof and thereby also will move the sensing wands relative to the crops. The movement of the wands will eventually project the beam of light to the null calibration setting which is between the photoelectric sensors.

For calibration purposes, the photoelectric sensors are mounted on a printed circuit board which is mounted to a slide plate for relative sliding adjustment attached to the housing. The slide plate is supported by slide supports and the slide supports have grooves in which the edges of the slide plate are engaged for sliding left or right along the grooves. An adjustment screw is axially fixed relative to the housing and threadably engages a flange on the slide plate. Rotation of the adjustment screw causes the adjustable positioning of the slide plate to the left or right depending upon the rotation of the screw. Calibration of the guidance system with respect to the position of the sensing wands can be accomplished by selective rotation of the adjustment screw.

BRIEF DESCRIPTION OF THE DRAWINGS

FIG. 7 is a side elevational view of another embodiment of the wand position sensing assembly which includes a means to compensate for the adverse effects of operations on side slopes and a means which applies a downward force on the sensing wands. The wand position sensing assembly is shown without one of the sensing wands.

FIG. 8 is a rear perspective view of the wand position sensing assembly of FIG. 7.

It should be understood that the drawings are not necessarily to scale and that an embodiment is sometimes illustrated in part by schematic and fragmentary views. It should be understood, of course, that the invention is not necessarily limited to the particular embodiments illustrated herein.

DESCRIPTION OF THE PREFERRED EMBODIMENT

Figure 1:
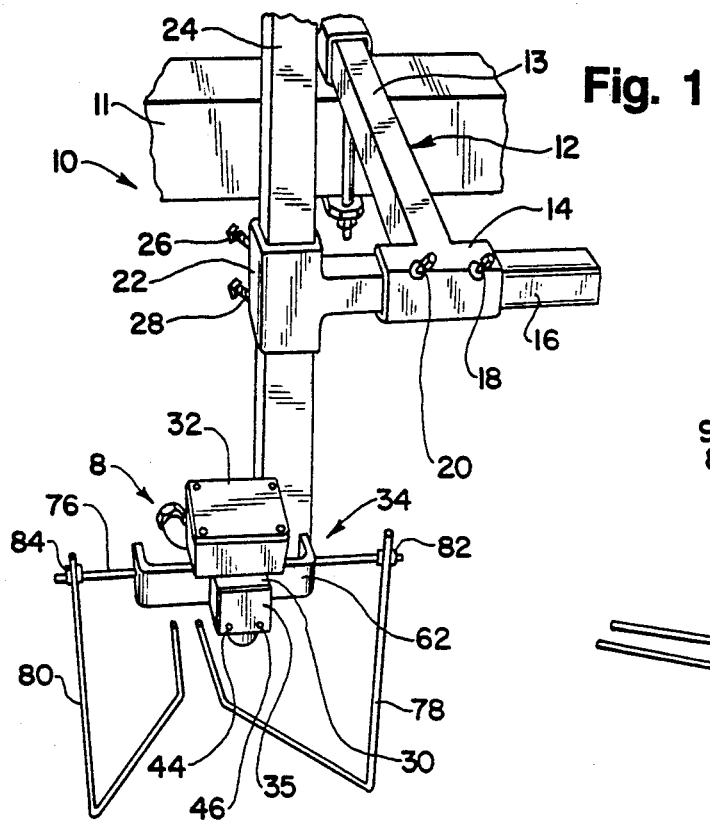
FIG. 1 is a perspective view of the wand mounting and position sensing assembly.
Figure 2:
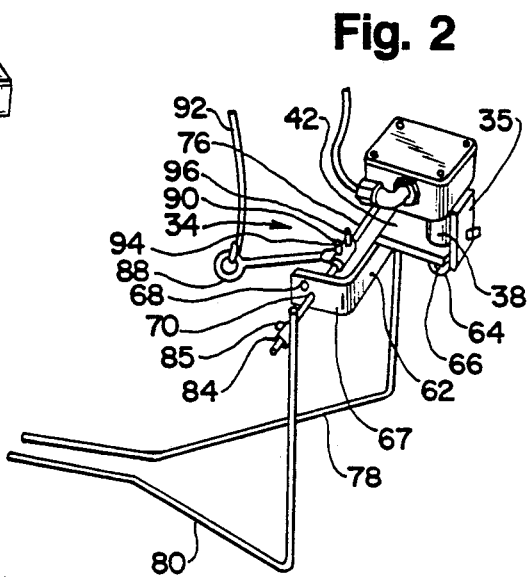
FIG. 2 is another perspective view of the wand sensing assembly of FIG. 1.
Figure 3:
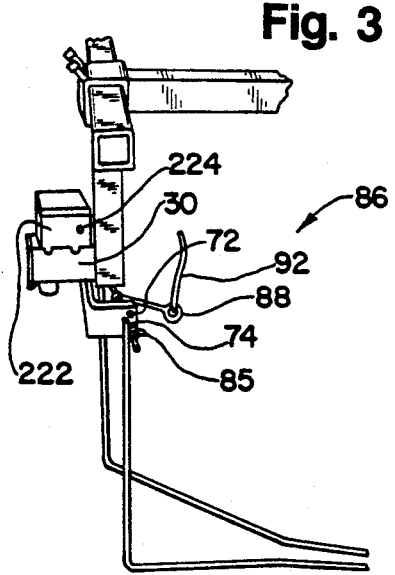
FIG. 3 is a side perspective view of the assembly of FIG. 1.

Referring to FIGS. 1-3, the wand position sensing assembly 8 is supported by a bracket assembly 10 which is fixedly mounted on an appropriate frame element 11 of an agricultural implement. The implement is not otherwise illustrated. It will be appreciated that the implement may be a row-crop cultivator or any other implement where accurate lateral positioning of the implement relative to rows of plants, ridges or other guidance references is important to the desired or optimum utilization and operation of the implement. As is known in this art, the purpose of the wand position sensor is to provide an output control signal corresponding to the instantaneous lateral position of the implement relative to the row reference. That control signal is derived from the position of the wands relative to the mechanism on which it is mounted. The control signal indicates the relative rotational position of the wands in a horizontal plane as the distal ends of the wands contact the plants or other row reference indicia. The control signal also indicates the relative rotational position of the wands as the implement frame shifts back and forth laterally of the rows due to variations in the guidance of the implement, field conditions, or the like.

The output control signal from the sensor typically serves as an input to an appropriate indicator or power control mechanism for assisting in or effecting the lateral positioning of the implement to an optimum operational position relative to the crop rows. For example, the output may drive a visible indicator observed by the operator of the implement or a towing tractor for appropriate corrective manual guidance to seek the optimum positioning of the implement. Alternatively, the output may be used as an input to an automatic power guidance mechanism for effecting automatic lateral adjustment of the implement relative to the sensed row or rows of crop plants. In one particular example, the guidance mechanism may be a power adjustable hitch arrangement such as currently is marketed by the Sukup Manufacturing Company of Sheffield, Iowa, under the trademark AUTOGUIDE.

The bracket assembly 10 provides orthogonal vertical and horizontal adjustable support for the sensor assembly 8 and includes a first horizontal bracket 12 which is affixed to the frame 11. The bracket 12 includes a laterally extending holder sleeve 14 at the forward end of support arm 13.

The sleeve 14 accepts another horizontal bracket arm 16. The horizontal bracket arm 16 slides laterally within the sleeve 14 to permit lateral adjustment of the sensing assembly 8 and is held in a selected position by set screws 18 and 20. A vertical sleeve 22 is attached to the end of the horizontal bracket arm 16. The sleeve 22 accepts a vertical bracket arm 24. The vertical bracket arm 24 slides within the sleeve 22 to permit vertical adjustment of the sensing assembly 8 and is held in a selected position by set screws 26 and 28.

Figure 4:
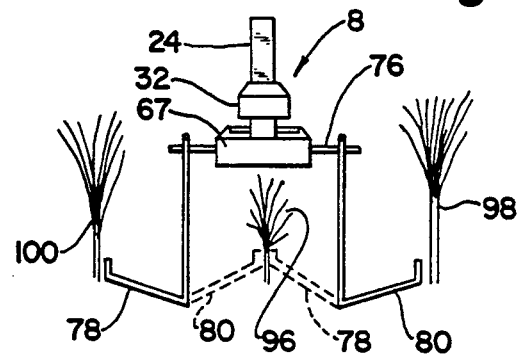
FIG. 4 is a front elevational view of the sensing wands positioned for sensing off of one row of crops (in phantom lines) or between two rows of crops (in solid lines).

The wand position sensing assembly 8 includes a support bracket 30 and housing 32 and a wand support assembly 34 which is pivotably supported therefrom. The housing is mounted on the bracket 30, as by screws 35 (FIG. 5), and the bracket 30 is affixed to the lower portion of the arm 24 whereby the housing 32 remains in fixed position relative to the bracket assembly 10 and hence relative to the implement. The bracket 30 is generally L-shaped in cross section, with a front plate 35, and may be attached to be offset at one side of the arm 24, as in FIG. 1, or to be aligned at the front of this arm as shown in FIG. 4. A vertical bearing sleeve 38 also is affixed to the bracket 30 and/or to the housing 32 for rotatably supporting the pivoting assembly 34.

The pivoting assembly 34 includes a vertical shaft 40 (see FIG. 5) which extends downward into sleeve 38. Appropriate bearings, not shown, rotatably support the shaft 40 in the sleeve 38 and thereby pivotably support the assembly 34. As shown in FIG. 2, the shaft 40 extends beyond the sleeve 38 and is attached to the top plate 42 of a wand bracket assembly 62. Specifically, the wand bracket 62 includes a collar 64 which is welded or affixed to the underside of plate 42 and the collar 64 has two holes which accept a roll pin 66. The collar 64 is positioned around the shaft 40 and is connected to the shaft by the roll pin 66.

The front plate 35 of support bracket 30 extends downward and in front of top plate 42. The front plate 35 has stops 44 and 46 which extend through the front plate 35 toward the front of top plate 42. The wand bracket assembly 62 can rotate approximately four (4) degrees from the center position before the front of top plate 42 contacts one of the stops 44 or 46. This arrangement prevents the wand bracket 62 from rotating more than eight (8) degrees so that the wands are maintained in the proper orientation.

The wand bracket assembly 62 also includes a U-shaped shaped support 67 which has two sets of holes 68, 70, 72 and 74 on each leg of the bracket. A wand support rod 76 is inserted into either the upper or lower sets of holes. When the crops are small in size, the wand support rod 76 may be inserted into the lower holes 70 and 74 so that the wands are closer to the ground and the crops. When the crops have grown, the wand support rod 76 may be inserted into the upper holes 68 and 72 so that the wands will avoid obstructions in the field near the base of the crops. The upper and lower holes provide another means of vertical adjustment in addition to the vertical bracket 24.

The wands 78 and 80 are attached to each end of support rod 76. Specifically, the collars 82 and 84 are welded or affixed to the upper ends of the wands 78 and 80, respectively. The collars 82 and 84 are positioned onto each end of the wand support rod 76 and the distance between the wands 78 and 80 is adjusted horizontally for the particular crop. The wands 78 and 80 are attached to the support rod 76 by set screws 85 in the collars 82 and 84. The set screws are loosened to adjust the position of the wands and tightened when the wands are in the desired position.

Referring to FIGS. 2 and 3, a wand lift assembly 86 is used to raise and lower the wands 78 and 80 which is sometimes necessary when the operator turns the implement at the end of the field. By raising the wands, the wands and wand sensing assembly will not be damaged by debris and other obstacles which can exist at the end of the field. The wand lift assembly 86 includes an eyebolt lever arm 88, a collar 90, and a lift cable 92. The eyebolt lever arm 88 is attached to the wand support rod 76. The lever arm 88 has a collar 90 which is welded or affixed to the end of the lever arm 88 and the support rod 76 is positioned inside the collar 90. The collar 90 includes two set screws 94 and 96 which are tightened to hold the lever arm 88 in the desired position relative to the support rod 76.

The lift cable 92 is attached to the eyebolt portion of the lever arm 88. The cable 92 is then routed through a series of pulleys so that the cable 92 can be acted upon by mechanical or manual means. When the cable is pulled upwards, the lever arm 88 would move upwards and cause the wand rod support 76 to rotate. As the wand rod support 76 rotates, the wands 78 and 80 would be raised upward away from the debris or other obstacles. After the operator had completed the turn at the end of the field and was ready to use the wand position assembly, the cable 92 would be released and the wands 78 and 80 would be lowered to the normal operating position.

As shown in FIG. 4, the wands 78 and 80 can be positioned to sense off of one row 96 of small crops or between two rows 98 and 100 of larger crops. The dotted lines demonstrate the positioning of the wands to sense off of one row 96 of crops. The solid lines demonstrate the positioning of the wands to sense between two adjacent rows 98 and 100 of crops. When the wands are sensing between two rows of crops, the two rows 98 and 100 are adjacent to each other and the wand position assembly 8 would not be straddling an intermediate row 96. In order to convert the wands from single row to two row sensing or from two row to single row sensing, the wands 78 and 80 are removed from the wand support rod 76 and attached to the opposite ends of the wand support rod 76.

Figure 5:
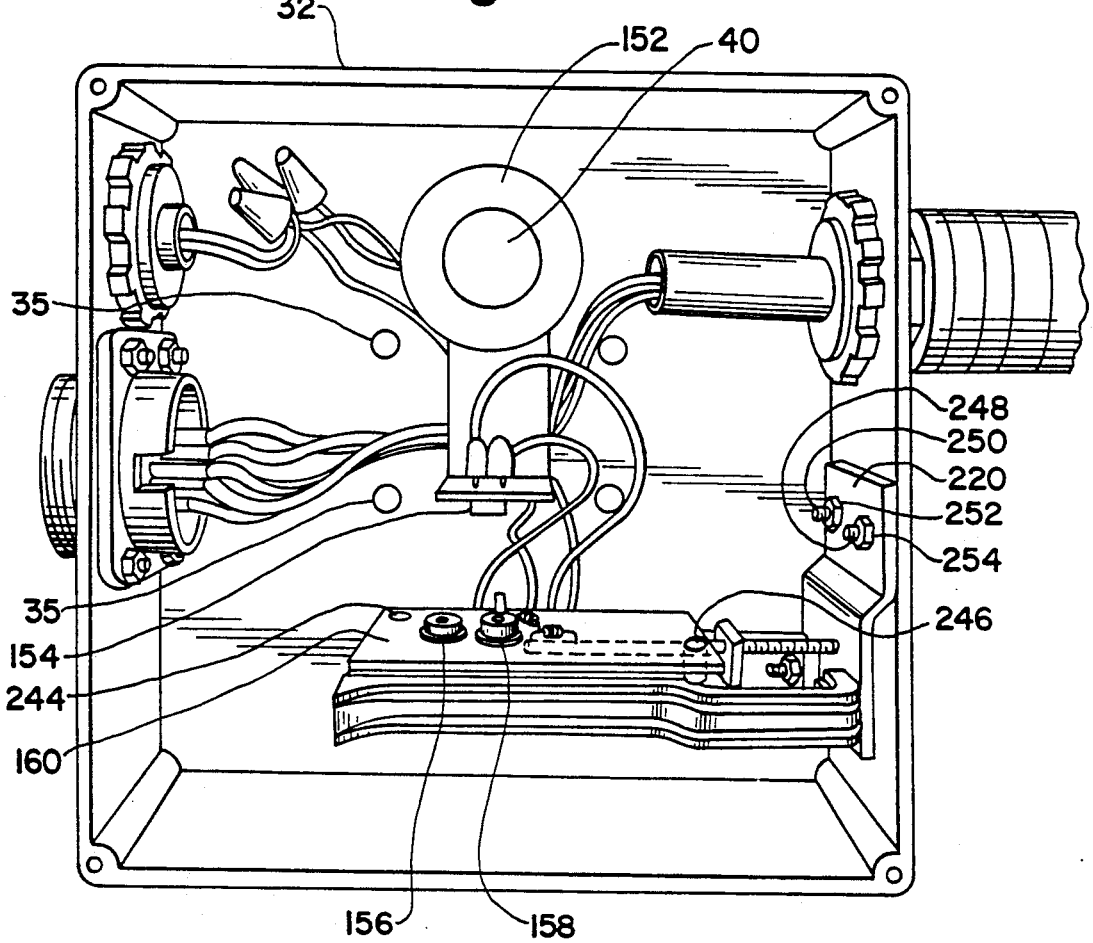
FIG. 5 is a top view of the wand sensor with the cover removed.

Referring to FIG. 5, a collar 152 is attached to the upper end of the support pivot shaft 40, within housing 32, and affixed to the collar is a photoelectric light source 154. The light source 154 projects a narrow beam of light toward a pair of photoelectric sensors 156 and 158. The photoelectric sensor 158 represents the right displacement for the sensing wands and the photoelectric sensor 156 represents the left displacement of the sensing wands. In the zero or null position of the wands, the beam of light should shine between the photoelectric sensors 156 and 158.

When the position of the implement varies to the left (from the view if one were facing in the direction of travel) relative to the crop row being cultivated or otherwise treated, the trailing ends of the sensing wands 78 and 80 are displaced to the right. The shaft 40 thereby is rotated in the corresponding direction and activates the photoelectric sensor 158. The photoelectric sensor 158 provides an electronic signal to the guidance controls (not shown). The guidance controls receive the signal and provide output for corrective action to the guidance indicator or mechanism which effects lateral adjustment of the implement. The guidance mechanism will then effect lateral adjustment of the implement which will move the sensing assembly 8 relative to the crops. The resulting relative movement of the wands 78 and 80 will eventually project the beam of light to the null calibration setting which is between the photoelectric sensors 156 and 158.

Similarly, when the sensing wands are displaced to the left, the shaft 40 is rotated in the corresponding direction and activates the photoelectric sensor 156. The photoelectric sensor 156 provides an electrical signal to the guidance controls which provide corresponding output for corrective action.

The photoelectric sensors 156 and 158 are mounted on a printed circuit board 160. The printed circuit board 160 is mounted to a slide plate 200. Spacers 240 and 242 are used to position the printed circuit board 160 above the slide plate 200. The printed circuit board 160 is attached to the slide plate 200 by screws 244 and 246 which are inserted into spacers 240 and 242.

Figure 6:
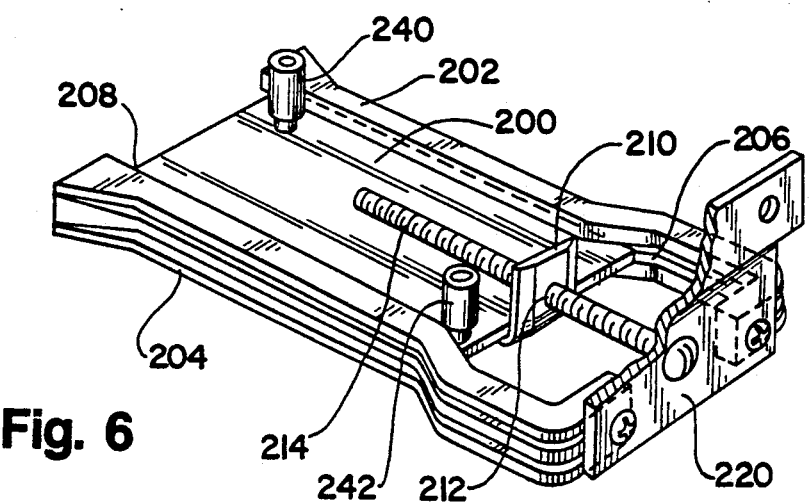
FIG. 6 is a three dimensional view of the adjustable calibration assembly.

As shown in FIG. 6, the slide plate 200 is supported by slide supports 202 and 204. The slide supports 202 and 204 have grooves 206 and 208 in which the edges of the slide plate 200 are positioned. The slide plate 200 is able to slide left or right inside the grooves 206 and 208. The slide supports 202 and 204 are affixed to a bracket 220 which is attached to the wand sensor housing 32, as by screws 248 and 250 and nuts 252 and 254.

A flange 210 is attached to one end of the slide plate 200 and has a threaded aperture 212. An adjustment screw 214 is positioned through a hole in the bracket 220 and threadably engages the flange 210. The rotation of the adjustment screw 214 causes the adjustable positioning of the slide plate 200 to the left or right axially of the screw, relative to the shaft 40 depending upon the rotation of the screw 214. As shown in FIG. 3, an access hole 224 is provided through housing 32 for selective access to the adjustment screw 214 in order to rotate the screw and effect the appropriate adjustment of the slide during calibration. A closure cap (not shown) normally is provided for access hole 224 to prevent ingress of foreign matter and moisture into the wand sensor housing 32.

Calibration of the guidance system with respect to the position of the sensing wands can be accomplished by selective rotation of the adjustment screw 214. The operator would remove the closure cap from the access hole 224 in the sensor housing. A small screwdriver or similar tool would be inserted into the access hole 224 and the adjustment screw 214 would be rotated. The operator would push inwards towards the adjustment screw 214 during rotation. The rotation of the adjustment screw 214 will cause the slide plate 200 and the attached photoelectric sensors 156 and 158 to move left or right relative to the axis of shaft 40 depending upon the direction of rotation of the adjustment screw. The adjustment screw 214 thus can be rotated until the sensor is precisely calibrated to a null setting on the guidance controls for any selected position of the wands. The closure cap would be replaced into the access hole 224 until it lightly contacts the adjustment screw 214 for holding the screw in its reference position with its head seated against the respective adjacent surface of bracket 220. Of course, other means may be utilized to capture and hold the adjustment screw in a fixed axial reference position. Similarly, various mounting techniques may be utilized to afford the linear adjustment of the sensors 156 and 158 in response to the movement of the adjustment screw.

An alternative embodiment of the wand position sensing assembly 308 is shown in FIGS. 7 and 8. The wand position sensing assembly 308 includes a side slope compensation assembly 310 to compensate for the adverse effects of operations on side slopes and a wand down-force assembly 312 which applies a downward force on the sensing wands 78 and 80.

Often operators must use the wand sensing assembly on a field which has a side slope, i.e. slopes to the left or right side of the implement as it travels along the field. Without the side slope compensation assembly, the wands would pivot toward the downhill side of the implement as a result of gravity acting upon the wands. The side slope compensation assembly 310 counterbalances the weight of the wands and negates the effect of gravity on the wands caused by the slope in the field.

The sensing assembly 308 differs from the sensing assembly 8 in that the support bracket 30, the housing 32 and the wand support assembly 34 are mounted behind the vertical bracket arm 24. This arrangement allows the weight of the wand bracket assembly 62, which includes, among other components, the U-shaped support 67 and the wand support rod 76, to partially counterbalance the weight of the wands 78 and 80 on the pivot point which is established by the shaft 40.

The side slope compensation assembly 310 includes a threaded shaft or bolt 314, a counterweight 316 and a retention nut 318. The threaded shaft 314 is attached to the center of U-shaped support 76. Specifically, the threaded shaft 314 is screwed into a threaded opening in the U-shaped support 76. The shaft 314 extends forward and away from the support 76 to establish a moment arm which the counterweight 316 can use to counterbalance the weight of the wands. The counterweight 316 is movably attached to the shaft 314. In this particular embodiment, the counterweight 316 has a threaded aperture and the counterweight 316 is threaded onto the shaft 314.

The counterweight 316 is positioned on the shaft 314 so that the weight counterbalances the weight of the wands 78 and 80 and the wand assembly when the wand position sensing assembly 308 is used on a field which has a side slope. The operator adjusts the effect of the counterweight by adjusting the position of the counterweight 316 on the shaft 314. If more counterbalance effect is needed, the operator positions the counterweight at the distal end of the shaft 314. Conversely, if less counterbalance effect is needed, the operator positions the counterweight at the base of the shaft 314 near the support 67. In this particular embodiment the operator adjusts the position of the counterweight 316 by turning the counterweight in a clockwise or counterclockwise direction to achieve the appropriate movement of the counterweight.

Since the counterweight 316 threadably engages the shaft 314, the rotation of the counterweight 316 causes the counterweight to move along the length of the shaft in the appropriate direction. After the operator has selected the appropriate position for the counterweight 316 on the shaft 314, the retention nut 318 is positioned and tightened against the counterweight 316 to prevent the counterweight 316 from moving along the shaft 314. If the position of the counterweight needs to be adjusted, the retention nut 318 is loosened and the counterweight 316 is adjusted to the appropriate position.

The wand down-force assembly 312 applies a downward force on the ends of the sensing wands 78 and 80. Often the wands are positioned near the base of the plants or crops and therefore the wands may encounter debris, dirt clumps and other obstacles which would cause unintended movement of the wands. The debris and other obstacles would cause the wand to move from the row crop and out of position. The down-force assembly exerts a downward pressure on the wands and negates the effects of debris and other obstacles which may inadvertently move the wands.

The wand down-force assembly 312 includes a leverage arm 330, a coiled spring 332, a spring attachment member 334 and a stop arm 336. The leverage arm 330 is attached to the wand support rod 76. In this particular embodiment, the leverage arm 330 has a collar 338 which is welded or affixed to the leverage arm 330 and the support rod 76 is positioned inside the collar 338. The collar 338 includes a set screw 339 which is tightened to hold the leverage arm 330 in the desired position relative to the support rod 76. The spring attachment member 334 is affixed to the underside of the U-shaped support 67. In this particular embodiment, the spring attachment member 334 is a nut which is welded to the underside of the support 67.

One end of a coiled spring 332 is attached to the spring attachment member 334 and the other end of the coiled spring 332 is attached to an opening in the distal end of leverage arm 330. The spring 332 is in tension and exerts a pulling force on the leverage arm 330. The spring 332 acting through the leverage arm 330 causes the support rod 76 to rotate in a counter-clockwise or a downward direction. (See FIG. 7). A stop arm 336 is attached to the wand support rod 76. In this particular embodiment, the stop arm 336 has a collar 340 which is welded or affixed to the end of the stop arm 336 and the support rod 76 is positioned inside the collar 340. The collar 340 includes a set screw 341 which is tightened to hold the stop arm 336 in the desired position relative to the support rod 76. The stop arm 336 is positioned so that the stop arm 336 contacts the U-shaped support 67 during normal operation. The stop arm 336 is held in contacting position with the support 67 due to the weight of the wands 78 and 80 and the counter-clockwise rotation of support rod 76 which is caused by spring 332 acting through leverage arm 330. (See FIG. 7).

The stop arm 336 and collar 342 prevent the support rod 76 from excessive horizontal movement relative to U-shaped support 67. The stop arm 336 is positioned on the support rod 76 near one of the legs of the U-shaped support 67. The collar 342 is positioned on the support rod 76 near the other leg of the U-shaped support 67. The collar 342 includes a set screw 343 which is tightened to hold the collar 342 in the desired position relative to the support rod 76. Thus, the collar 342 and stop arm 336 capture the support rod 76 so that it has minimal horizontal movement relative to U-shaped support 67 without the stop arm 336 and collar 342 binding on the legs of support 67. The wand position sensing assembly 8, shown in FIGS. 1-4, also includes a stop arm and a collar to reduce horizontal movement of the support rod 76.

The wands 78 and 80 may encounter debris and other obstacles which would cause unintended movement of the wands. When the wands 78 and 80 encounter an obstacle without the down force assembly, the wands would move upwards and cause the support rod 76 to rotate in a clockwise direction. (See FIG. 7). In order to reduce or eliminate the rotational movement of the support rod 76 when the wands 78 and 80 encounter an obstacle, the spring 332 exerts a counter-clockwise rotation on the support rod 76 and concomitantly a downward force on the ends of wands 78 and 80. If the wands 78 and 80 encounter an obstacle which exerts an upward force on the wands greater than the downward force exerted by the spring 332 acting through the leverage arm 330, the support rod 76 will rotate in a clockwise direction by stretching the coil spring 332. (See FIG. 7). After the wands 78 and 80 are no longer in contact with the obstacle or the upward force exerted on the wands is less than the downward force exerted by the spring 332 acting through the leverage arm 330, the support rod 76 returns to its normal operating position whereby the stop arm 336 is in contact with the U-shaped support 67. The down force assembly thus eliminates or reduces unnecessary movement of the wands 78 and 80 and the corresponding rotational movement of the support rod 76.

Figure 9:
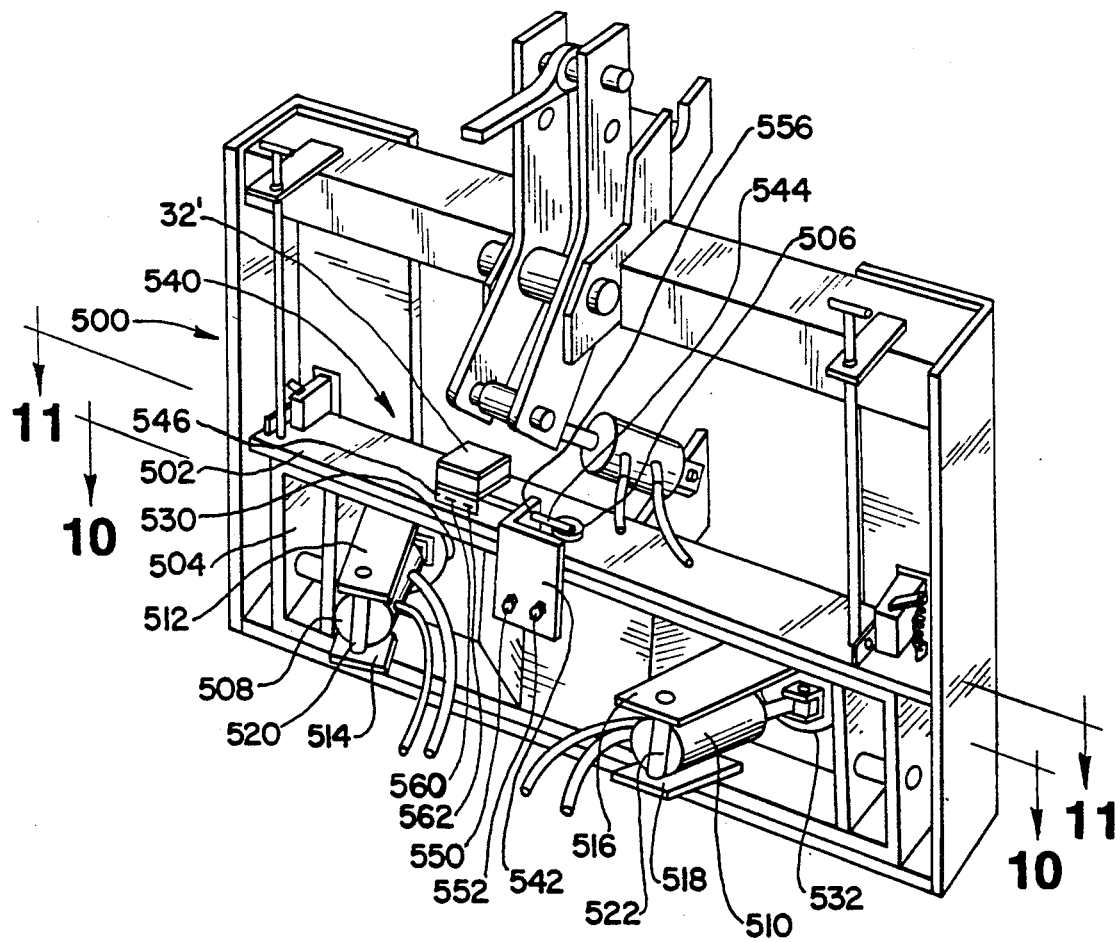
FIG. 9 is a perspective view of the tractor side of a guidance mechanism.
Figure 10:
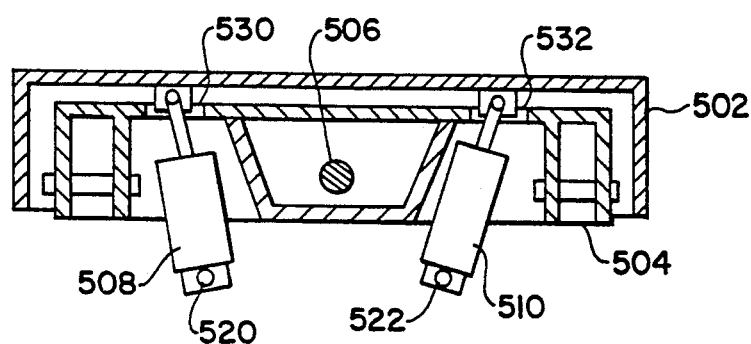
FIG. 10 is a sectional view of the guidance mechanism of FIG. 9 along line 10.
Figure 11:
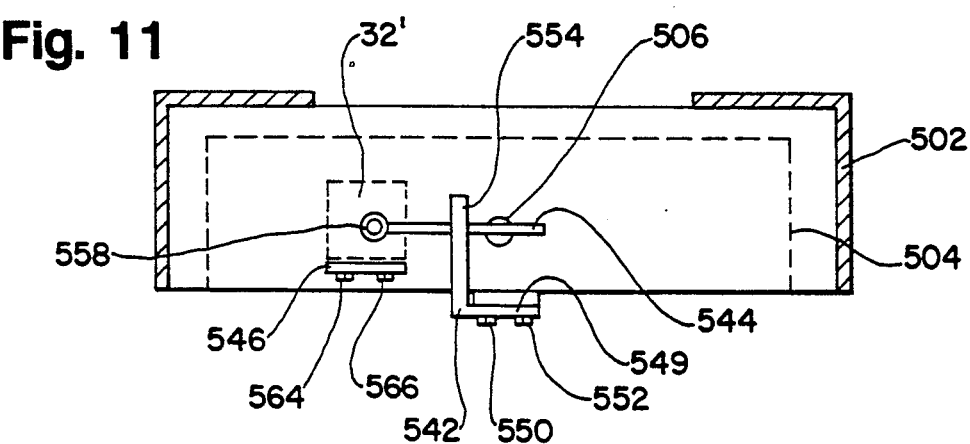
FIG. 11 is a sectional view of the guidance mechanism of FIG. 9 along line 11.

Referring to FIG. 9 the housing 32 can also be mounted on the positioning mechanism 500 which assures proper positioning of the machine relative to the row of plants. One type of positioning mechanism is shown in U.S. Pat. application Ser. No. 07/424,701 which was filed on Oct. 20, 1989. However, there are many types of positioning mechanisms which are well known in the art. The positioning mechanism 500 has a lower horizontal frame member 502. An inner frame member 504 is pivotally mounted within the lower horizontal frame member 502 by a vertical pivot pin 506. The inner frame member 504 is able to move within the cavity formed by lower frame member 502. Support flanges 512, 514, 516 and 518 are welded to the inner frame member 504. Hydraulic cylinders 508 and 510 are pivotally attached to these support flanges by pins 520 and 522 respectively. The rod ends of the hydraulic cylinders are projected through the openings 530 and 532 in the inner frame member 504 and are attached to the lower frame member 502.

When the hydraulic cylinders 508 and 510 are operated by the guidance system, the cylinders 508 and 510 are correspondingly extended and retracted. As the cylinders are extended and retracted, the lower frame member 502 pivots on pin 506 and the lateral angle of the lower frame member 502 with respect to the inner frame member 504 changes to shift slightly the position of the attached implement laterally relative to the tractor. (See FIG. 12)

A positioning mechanism sensing assembly 540 is attached to the positioning mechanism 500. The sensing assembly 540 indicates the position of the inner frame member 504 with respect to the lower frame member 502. The sensing assembly 540 includes an inner frame position bracket 542, a position indication shaft 544, a sensor housing 32' and mounting brackets 546 and 548 for the sensor housing. The bracket 542 is L-shaped in cross section and one leg 549 is attached to the inner frame 504 with bolts 550 and 552. The other leg 554 of the bracket has a portion removed so that the remaining portion of the leg extends over the horizontal surface of frame member 502.

The leg 554 has an opening 556 and a rubber grommet is positioned into the opening 556. The position indication shaft 544 is then inserted into the rubber grommet. The rubber grommet holds the shaft and permits the shaft to move with respect to the bracket leg 556. Although the rubber grommet holds the shaft, it also permits flexible movement so that the shaft can pivot within the opening 556.

The position indication shaft 544 has a collar 558 which is welded or affixed to the end of shaft 544. The collar 558 is then attached to a shaft 40 which is extending downward from the sensor housing 32. (See FIG. 5). The sensor housing 32 is mounted on a mounting bracket 548 which has an L-shaped cross-section similar to bracket 30. A vertical bearing sleeve (not shown) similar to bearing sleeve 38 is also affixed to the underside of bracket 548 for rotatably supporting the shaft 40. The bracket 548 is then attached to support bracket 546 with bolts 564 and 566. The support bracket 546 has horizontal slots 560 and 562 which permit lateral adjustment of the bracket 548 prior to tightening bolts 564 and 566. The housing 32 which is mounted on the positioning mechanism 500 is similar but larger than the housing 32 for the sensing assembly 8 in order to accommodate additional electrical wiring.

Figure 12:
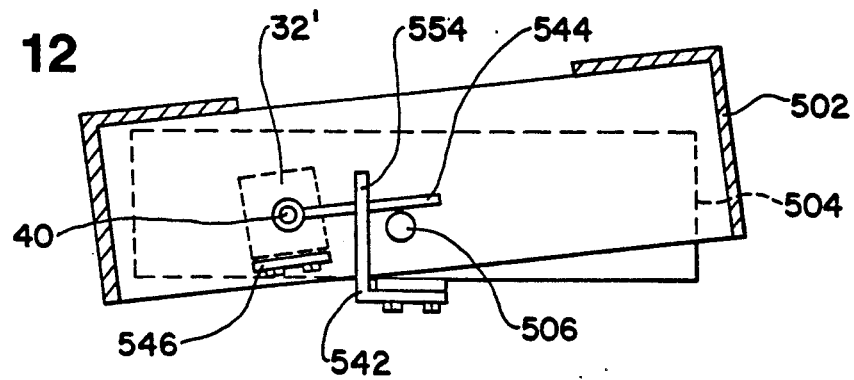
FIG. 12 is a sectional view of the guidance mechanism of FIG. 9 along line 11 when the guidance mechanism is pivoted to one side.

The positioning assembly 540 operates in the following manner. When the lower frame member 502 pivots on pin 506, the lateral angle of the lower frame member 502 with respect to the inner frame member 504 changes as shown in FIG. 12. During the pivoting movement of frame member 502, the sensor housing 32 and shaft 40 also move or pivot backwards relative to the bracket 542 since the housing 32 is fixedly mounted to the frame member 502. In response to this movement, the shaft 544 also pivots where the shaft 544 is pivotally mounted to the bracket 542. As the shaft 544 pivots in the bracket 542, the vertical shaft 40 will rotate to accommodate the movement of the shaft. As previously described, the rotation of the shaft 40 in housing 32 will result in an output signal to the guidance controls.

Thus, the guidance controls will receive output signals from the housing 32 on the wand sensing assembly 8 and from the housing 32' on the positioning mechanism 500. As known in the art, the guidance controls will use this output information to operate the guidance mechanism 500. This output information can also be used to perform additional features of the guidance control, such as, a sensitivity feature or a tracking/biasing feature.

It will be appreciated that an improved sensor support and calibration system has been provided which meets the aforestated objects.

While specific embodiments of the invention have been shown and described, it will be understood, of course, that the invention is not limited thereto since modifications may be made and other embodiments of the principles of this invention will occur to those skilled in the art to which this invention pertains. Therefore, it is contemplated by the appended claims to cover any such modifications and other embodiments as incorporate the features of this invention within the true spirit and scope of the following claims.

What is claimed is:

1. An agricultural implement guidance system comprising a sensing means for sensing the position of plants or other ground reference indicia, a position indication means for indicating the position of said sensing means relative to an implement on which said sensing means is mounted, a receiving means for receiving a signal from said position indication means in accordance with the relative position therebetween, and an adjustment means for adjusting the relative position of said receiving means or said position indication means with respect to the other, said adjustment means including a rotatable threaded drive element which effects such relative positioning adjustment movements during the rotation of said element.

2. The invention as in claim 1 wherein said sensing means includes at least one sensing wand.

3. The invention as in claim 1 wherein said position indication means is a photoelectric light source which emits a beam of light.

4. The invention as in claim 3 wherein said receiving means is at least one photoelectric sensor.

5. The invention as in claim 1 wherein said adjustment means is a screw which is attached to said receiving means whereby rotation of said screw provides adjustment of the position of said receiving means relative to said sensing means.

6. The invention as in claim 1 wherein said adjustment means comprises a plate for attaching the receiving means, at least one channeled support which supports and guides said plate, and a screw which threadably engages said plate whereby rotation of said screw provides controlled positioning of aid receiving means.

7. An agricultural implement guidance system comprising a sensing means for sensing the position of plant or other ground reference indicia, a photoelectric light source which emits a beam of light, means for moving said light source to adjust the position of aid beam in accordance with movement of aid sensing means during normal operation, a photoelectric sensor for receiving the beam of light from said photoelectric light source, and an adjustment means including a positive drive for calibration adjustment of the relative position between said photoelectric sensor means and said photoelectric light source.

8. The invention as in claim 7 wherein said adjustment means is a screw which is attached to said photoelectric sensor.

9. The invention as in claim 7 wherein said adjustment means comprises a plate for attaching the photoelectric sensor, at least one channeled support which supports and guides said plate, and a screw which threadably engages said plate whereby rotation of said screw providing controlled positioning of said receiving means.

10. An adjustment mechanism for an agricultural implement guidance system which system has a photoelectric light source which emits a beam of light towards a photoelectric sensor, means mounting said light source and said photoelectric sensor for movement of one relative to the other during normal operation of said guidance system to generate output signals for guidance control of said implement, and calibration means comprising a screw element and a complimentary threaded driving element which are attached to one of said 11. The invention as in claim 10 wherein said adjustment mechanism further comprises a plate for attaching the photoelectric sensor and which threadably engages said screw and at least one channeled support which supports and guides said plate whereby rotation of said screw adjusts the position of said photoelectric sensor with respect to said photoelectric light source.

12. An agricultural implement guidance system comprising at least one sensing wand for sensing the position of plants or other ground reference indicia, a photoelectric light source which emits a beam of light for indicating the position of the sensing wand, at least one photoelectric sensor for receiving a signal from the photoelectric light source in accordance with the relative position therebetween, and an adjustment screw which is attached to said photoelectric sensor whereby rotation of said screw provides a means for adjustment of the position of said photoelectric sensor relative to said wand.

13. An agricultural implement comprising an implement frame for supporting the implement tools or units, at least one sensing wand for sensing the position of plants or other ground reference indicia, a photoelectric light source which emits a beam of light for indicating the position of the sensing wand, at least one photoelectric sensor for receiving a signal from the photoelectric light source in accordance with the relative position therebetween, an adjustment screw which is attached to said photoelectric sensor whereby rotation of said screw provides a means for adjustment of the position of said photoelectric sensor relative to said wand, and a support structure for supporting said sensing wand, said photoelectric light source, said photoelectric sensor, and said adjustment screw.

14. An agricultural implement guidance system comprising a sensing means for sensing the position of plant or other ground reference indicia, a photoelectric light source which emits a beam of light, means for moving said light source to adjust the position of said beam in accordance with movement of said sensing means during normal operation, a photoelectric sensor for receiving the beam of light from said photoelectric light source, and a calibration screw means, attached to said photoelectric sensor, for calibration adjustment of the position of said photoelectric sensor means with respect to said photoelectric light source.

15. An agricultural implement guidance system comprising a sensing means for sensing the position of plant or other ground reference indicia, a photoelectric light source which emits a beam of light, means for moving said light source to adjust the position of said beam in accordance with movement of said sensing means during normal operation, a photoelectric sensor for receiving the beam of light from said photoelectric light source, and an adjustment means for calibration adjustment of the position of said photoelectric sensor means with respect to said photoelectric light source, said adjustment means comprising a plate for attaching the photoelectric sensor, at least one channeled support which supports and guides said plate and a screw which threadably engages said plate whereby rotation of said screw provides controlled positioning of said receiving means.

16. An agricultural implement guidance system comprising a sensing means for sensing the position of plants or other ground reference indicia, a position indication means for indicating the position of said sensing means relative to an implement on which said sensing means is mounted, a receiving means for receiving a signal from said position indication means in accordance with the relative position therebetween, a positive drive means connected to said receiving means for moving said receiving means into alignment with said position indicating means during calibration of said system.

17. The system of claim 16 wherein said position indicating means includes a photoelectric light source and said receiving means includes at least one photoelectric sensor.

18. The system of claim 17 wherein said positive drive means includes a plate for attaching said photoelectric sensor, said plate threadably engaging a screw, and at least one channeled support which supports and guides said plate, whereby said screw may be rotated to laterally move said plate and drive said photoelectric sensors into calibration alignment with said photoelectric light source.

* * * * *

UNITED STATES PATENT AND TRADEMARK OFFICE
CERTIFICATE OF CORRECTION

PATENT NO. : 5,103,917
DATED : April 14, 1992
INVENTOR(S) : Michael L. Moore

It is certified that error appears in the above-identified patent and that said Letters Patent is hereby corrected as shown below:

On The Title Page:

[21] Appl. No.: delete "516,036" and substitute therefore --516,035--

Col. 5, line 4, delete duplicate occurrrence of "shaped"

Col. 11, line 46, delete "aid" and substitute therefor --said--

Col. 11, and line 51, delete "aid" and substitute therefor --said--; and line 52, delete "aid" and substitute therefor --said--

Col. 12, line 10, after the word "said" insert --light source and said photoelectric sensor for effecting adjustment movements of the reference positions of one relative to the other during rotation of one of said elements.--

Signed and Sealed this

Sixth Day of July, 1993

Attest:

MICHAEL K. KIRK

Attesting Officer

Acting Commissioner of Patents and Trademarks